United States Patent
Arno et al.

(10) Patent No.: US 7,285,156 B2
(45) Date of Patent: Oct. 23, 2007

(54) INLINE, POINT-OF-USE AIR/GAS DRYNESS INDICATOR

(75) Inventors: Michael J. Arno, 5850 Kraus Rd., Clarence, NY (US) 14031; Allan A. Hoerner, Alden, NY (US)

(73) Assignee: Michael J. Arno, Clarence, NY (US)

( * ) Notice: Subject to any disclaimer, the term of this patent is extended or adjusted under 35 U.S.C. 154(b) by 410 days.

(21) Appl. No.: 10/931,463

(22) Filed: Sep. 1, 2004

(65) Prior Publication Data

US 2005/0201893 A1  Sep. 15, 2005

Related U.S. Application Data

(60) Provisional application No. 60/553,163, filed on Mar. 15, 2004.

(51) Int. Cl.
*B01D 53/02* (2006.01)

(52) U.S. Cl. ............ 96/117.5; 55/518; 55/DIG. 17; 73/29.04

(58) Field of Classification Search ............ 96/117.5, 96/134, 147; 55/516, 518, 519, DIG. 17; 422/58; 73/23.2, 29.04; 34/89
See application file for complete search history.

(56) References Cited

U.S. PATENT DOCUMENTS

| | | |
|---|---|---|
| 1,681,531 A | 8/1928 | Gannon |
| 1,839,350 A | 1/1932 | Slagel |
| 1,866,659 A | 7/1932 | Litle, Jr. |
| 2,199,258 A | 4/1940 | Gray .................. 210/131 |
| 2,214,925 A | 9/1940 | Gutrie .................. 252/2 |
| 2,273,779 A | 2/1942 | Dickey et al. ........... 183/75 |
| 2,325,657 A | 8/1943 | Burkness ............... 210/134 |
| 2,526,782 A | 10/1950 | Thorpe .................. 183/45 |
| 2,526,938 A | 10/1950 | Davis et al. ............ 252/408 |
| 2,536,274 A | 1/1951 | Gaugler ................ 210/131 |
| 2,554,879 A | 5/1951 | Race, Jr. ................ 183/4.8 |
| 2,558,125 A | 6/1951 | Cullen .................. 55/433 |
| 2,579,053 A | 12/1951 | Schulstadt .............. 210/131 |
| 2,593,132 A | 4/1952 | Gannon ................. 183/4.8 |
| 2,649,923 A | 8/1953 | Woppman .............. 183/4.8 |
| 2,671,526 A | 3/1954 | Hunt et al. ............. 183/4.8 |

(Continued)

FOREIGN PATENT DOCUMENTS

EP  0042683 A1  12/1981

(Continued)

*Primary Examiner*—Frank M. Lawrence
(74) *Attorney, Agent, or Firm*—Walter W. Duft

(57) ABSTRACT

A low-profile dryness indicator for point-of-use operation in an air/gas line delivering compressed air or gas to an air/gas-driven tool. The apparatus includes a vessel having a first end, a second end, and a central portion formed by a light transmissive wall that defines a containment chamber containing a dryness-indicating material, such as a color-changing desiccant or moisture sensitive paper. A rigid protective housing is disposed around the vessel wall and has one or more view ports for viewing the dryness-indicating desiccant in the containment chamber. The protective housing is closed by first and second end cap fittings that are each configured for connection to a compressed air/gas line, or to an air tool, and include a passage for transferring air or gas to or from an adjacent one of the plenum-defining cavities.

35 Claims, 6 Drawing Sheets

U.S. PATENT DOCUMENTS

| | | | | |
|---|---|---|---|---|
| 2,671,528 A | 3/1954 | Gross | | 183/49 |
| 2,751,999 A | 6/1956 | Semon | | 55/513 |
| 2,845,138 A | 7/1958 | Gageby | | 183/4.8 |
| 2,987,175 A | 6/1961 | Bottum | | 206/46 |
| 3,008,540 A | 11/1961 | Gibson, Jr. | | 96/121 |
| 3,029,581 A | 4/1962 | Robbins | | 55/316 |
| 3,047,993 A | 8/1962 | Robbins | | 55/274 |
| 3,085,424 A * | 4/1963 | Berg | | 73/29.02 |
| 3,090,490 A | 5/1963 | Yocum | | 210/299 |
| 3,169,112 A | 2/1965 | Nelson | | 210/266 |
| 3,209,917 A | 10/1965 | Yelinek | | 210/484 |
| 3,240,567 A | 3/1966 | Caparreli et al. | | 23/284 |
| 3,246,758 A | 4/1966 | Wagner | | 210/94 |
| 3,358,428 A | 12/1967 | Mann | | 55/387 |
| 3,415,041 A | 12/1968 | Kraissl, Jr. | | 55/342 |
| 3,464,186 A | 9/1969 | Hankison et al. | | 55/163 |
| 3,479,146 A | 11/1969 | Hochman et al. | | 23/288 |
| 3,585,963 A * | 6/1971 | Hiszpanski | | 116/206 |
| 3,681,899 A | 8/1972 | Grote | | 55/503 |
| 3,705,480 A | 12/1972 | Wireman | | 55/275 |
| 3,724,177 A | 4/1973 | Grote | | 55/316 |
| 3,941,573 A | 3/1976 | Chapel | | 55/316 |
| 4,146,277 A * | 3/1979 | Santoro | | 96/117.5 |
| 4,162,826 A * | 7/1979 | Van der Beck et al. | | 359/894 |
| 4,177,049 A | 12/1979 | Haslett, Jr. | | 55/483 |
| 4,478,619 A | 10/1984 | Arends et al. | | |
| 4,548,624 A | 10/1985 | Waller | | 55/274 |
| 4,612,026 A | 9/1986 | Pollara et al. | | 96/117.5 |
| 4,705,543 A | 11/1987 | Kertzman | | 96/6 |
| 4,741,697 A * | 5/1988 | Herbison | | 433/25 |
| 4,746,338 A | 5/1988 | Williams | | 55/275 |
| 4,770,678 A | 9/1988 | Haslett, Jr. | | 55/179 |
| 4,811,571 A | 3/1989 | Mayer | | 62/474 |
| 4,822,387 A | 4/1989 | Daniels | | 55/323 |
| 5,110,330 A | 5/1992 | Loughran | | 55/275 |
| 5,240,483 A | 8/1993 | Rosen | | 96/137 |
| 5,350,442 A | 9/1994 | Thelen et al. | | 95/115 |
| 5,427,609 A | 6/1995 | Zoglman et al. | | 95/98 |
| 5,580,451 A | 12/1996 | Tack | | 210/266 |
| 5,630,855 A | 5/1997 | Lundbäck | | 96/405 |
| 5,667,566 A | 9/1997 | Flynn et al. | | 96/138 |
| 5,681,370 A | 10/1997 | McMahon | | 95/105 |
| 5,683,499 A | 11/1997 | Kiyani | | 96/147 |
| 5,746,807 A | 5/1998 | Thelen et al. | | 95/123 |
| 5,846,271 A | 12/1998 | Flynn et al. | | 55/315 |
| 6,217,639 B1 * | 4/2001 | Jackson | | 96/134 |
| 6,309,450 B1 | 10/2001 | Millen et al. | | 96/131 |
| 6,402,811 B1 | 6/2002 | Shanks et al. | | 95/90 |
| 6,585,173 B2 | 7/2003 | Schmon et al. | | 239/526 |
| 6,835,234 B2 | 12/2004 | Leffel et al. | | 96/108 |
| 2005/0132887 A1 | 6/2005 | Mitsch et al. | | 96/108 |

FOREIGN PATENT DOCUMENTS

JP 54-46185 A 4/1979

* cited by examiner

INLINE, POINT-OF-USE AIR/GAS DRYNESS INDICATOR

CROSS-REFERENCE TO RELATED APPLICATIONS

This application claims benefit of the filing date of U.S. Provisional Application No. 60/553,163, filed on Mar. 15, 2004.

BACKGROUND OF THE INVENTION

1. Field of the Invention

The present invention relates to the field of compressed air and gas systems, and more particularly to dryness indicators designed to visually indicate the moisture content of compressed gas or air delivered to a point of use.

2. Description of Prior Art

Typical compressed air or gas produced by a compressor apparatus is saturated with 50% to 100% relative humidity. Removal of this moisture vapor requires that an air/gas drying system be used, such as a refrigerated dryer or an adsorbent type of dryer. Such apparatus are generally very effective, the latter being typically capable of drying compressed air or gas to below-zero dew point levels. Notwithstanding such drying measures, there is unfortunately no guarantee that the compressed air or gas will have the desired dryness by the time it arrives through an air/gas feed system to a downstream point of use. Compressed air lines, various fitting and regulation devices, or improper operation of the dryer system all represent sources of residual moisture vapor entrainment in the air/gas feed system. This means that moisture-treated compressed air or gas may be carrying unwanted moisture vapor when it goes into use as an application.

One area where this problem tends to occur is in paint booth operations where compressed air or gas is used as a propellant to atomize and expel paint from a paint gun. Even though extraordinary measures are often implemented to eliminate moisture vapor at the compressed air/gas source, moisture can still be delivered to the paint gun. In some cases, this may be due to the drying system losing effectiveness due to a malfunction or other problem. However, even if the drying system is operating at full operational efficiency, the lengthy hoses connecting the air source to the paint gun can introduce unwanted moisture vapor into the system. In particular, these hoses can be disconnected and re-connected any number of times throughout the course of a painting application. Each time a disconnection occurs, moisture-laden ambient air is allowed to enter the air/gas line, and will feed through the paint gun until such time as it evacuated from the line and replaced by dry air/gas coming from the air/gas source. Any time there is excess moisture vapor in a paint gun, unwanted fouling can occur that results in a bad and unacceptable paint job. In most cases, the unsuspecting painter will assume the air/gas quality is satisfactory, particularly when there is sophisticated drying equipment operating at the air/gas source.

Various dryness indicators have been proposed for use in compressed air, gas and refrigerant applications. These typically involve the use of a moisture-adsorbing silica gel desiccant that is impregnated with a chemical moisture indicator, such as a cobalt salt. This particular chemical indicator is normally a deep blue color when it is dry, but gradually turns a light pink color in proportion to the amount of moisture that is present as the salt hydrates. The color-indicating desiccant is placed in a transparent or translucent container so that it can be viewed during operations. In a dryness indicator, the color-indicating desiccant is placed in contact with a compressed air/gas stream within a transparent or translucent container, so that the desiccant can be viewed during operations.

Prior art dryness indicators tend to have design features that prevent them from being optimally suited for point-of-use operation adjacent a hand-held air/gas-driven tool, such as a paint gun, where moisture monitoring is most needed. In all of the reference materials reviewed, the prior art dryness indicators form part of a filter/dryer that requires a relatively large quantity of desiccant to effectively remove moisture for a reasonable length of time. This quantity of desiccant is more than that which is required to indicate dryness. The filter/dryers in which prior art dryness indicators are incorporated also tend to include additional elements to condense and remove moisture droplets from the air/gas stream, and to trap oil, line debris and other contaminants. As a result of the foregoing design features, most prior art dryness indicators are large or bulky, and not suitable for attachment to a hand-held tool. Other prior art indicating devices are less bulky, but may not be rugged enough to withstand the environmental conditions in which a point-of-use dryness indicator must operate. Such conditions include shock forces when the tool is disconnected and the dryness indicator (still attached to air/gas hose) is dropped onto the floor. While on the floor, the dryness indicator can also be stepped on and thus subjected to crush forces and other abuses.

It is to solving the foregoing problems that the present invention is directed. What is particularly needed is an improved compressed air/gas dryness indicator that is optimized for point-of-use installation between an air/gas hose and an air/gas-driven tool, such as a paint gun. Ideally, the dryness indicator needs to provide a visual indication identifying the exact state of dryness of the compressed air/gas line, yet must be unobtrusive and afford full freedom of movement at the point-of-use without any impediment of bulky filters, desiccant containers, cumbersome vessels, etc. The dryness indicator additionally needs to be rugged and durable, so as to withstand the shock and crush forces that are likely to be experienced during everyday use when the indicator is mounted at the end of an air/gas hose. Finally, the dryness indicator should be easy to install and use, should be simple and inexpensive, and should require no maintenance.

SUMMARY OF THE INVENTION

The foregoing problems are solved and an advance in the art is achieved by a novel low-profile dryness indicator apparatus for point-of-use operation in an air/gas line delivering compressed air or gas to an air/gas-driven tool. In exemplary embodiments of the invention, the apparatus includes a vessel having a first end, a second end, and a central portion disposed between the first and second ends. The central portion of the vessel is formed by a light transmissive vessel wall that defines a containment chamber containing a dryness-indicating, color-changing desiccant, or other moisture sensitive material. A rigid protective housing includes first and second ends and a durable, crush-resistant, central cover portion disposed around the vessel wall. One or more closed-perimeter view ports are provided in the central portion of the protective housing for viewing the dryness-indicating desiccant in the containment chamber. First and second air/gas-permeable closures respectively close the first and second ends of the vessel.

Each closure can be formed with a central raised portion on an inner side thereof extending into the containment chamber, and a plenum-defining cavity on an outer side thereof facing away from the containment chamber. First and second end cap fittings respectively close the first and second ends of the protective housing. The end cap fittings are each configured for connection to an air/gas line, or to an air tool, and include a passage for transferring air or gas to or from an adjacent one of the plenum-defining cavities. The protective housing preferably has a major surface portion that is substantially the same cross-sectional size as an air/gas line to which the dryness indicator is adapted to be attached, and may also be of reduced length.

BRIEF DESCRIPTION OF THE DRAWINGS

The foregoing and other features and advantages of the invention will be apparent from the following more particular description of exemplary embodiments of the invention, as illustrated in the accompanying Drawings in which.

DETAILED DESCRIPTION OF EXEMPLARY EMBODIMENTS

Figure 1:
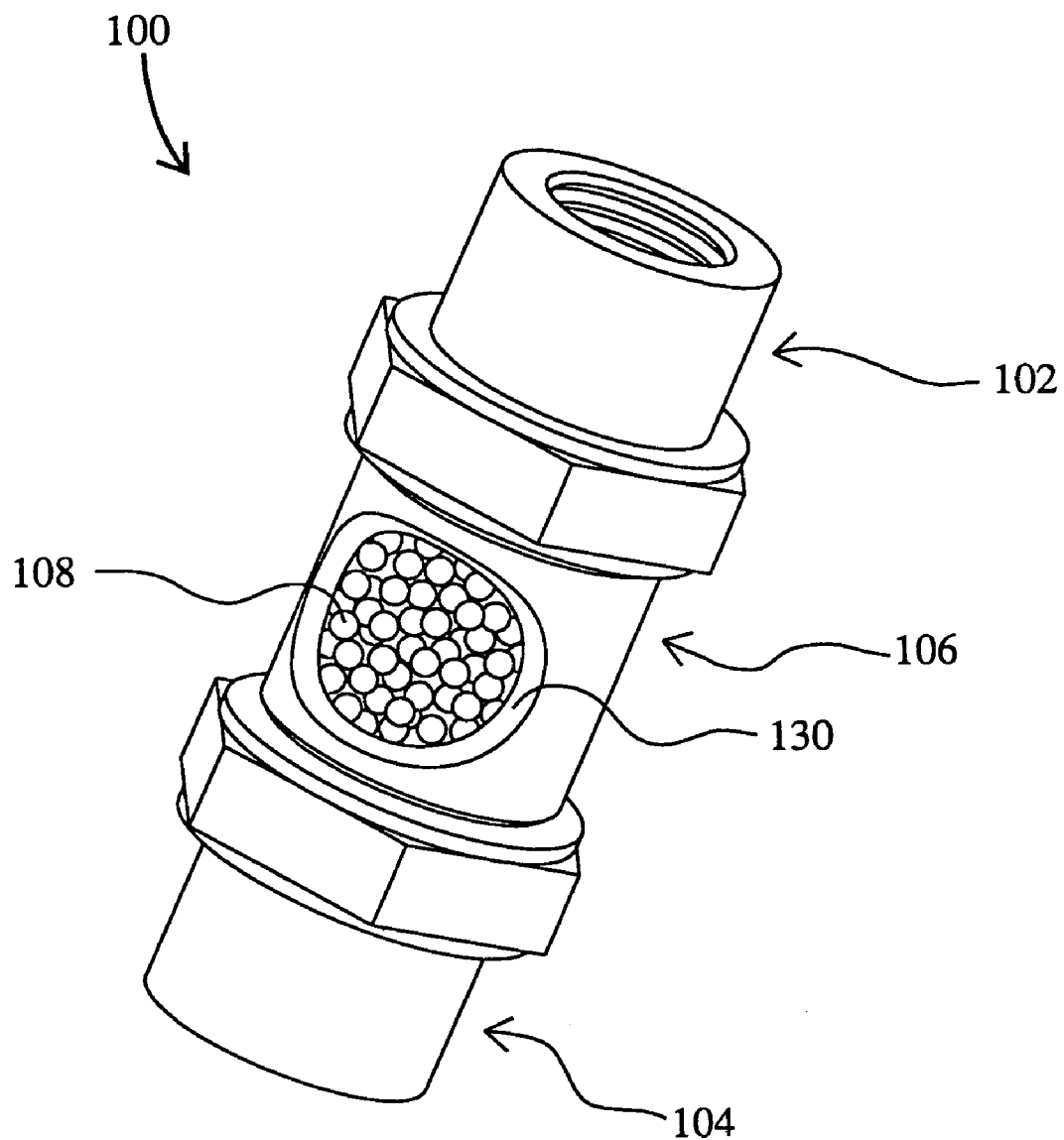
FIG. 1 is a perspective view showing a dryness indicator constructed in accordance with the present invention.
Figure 2:
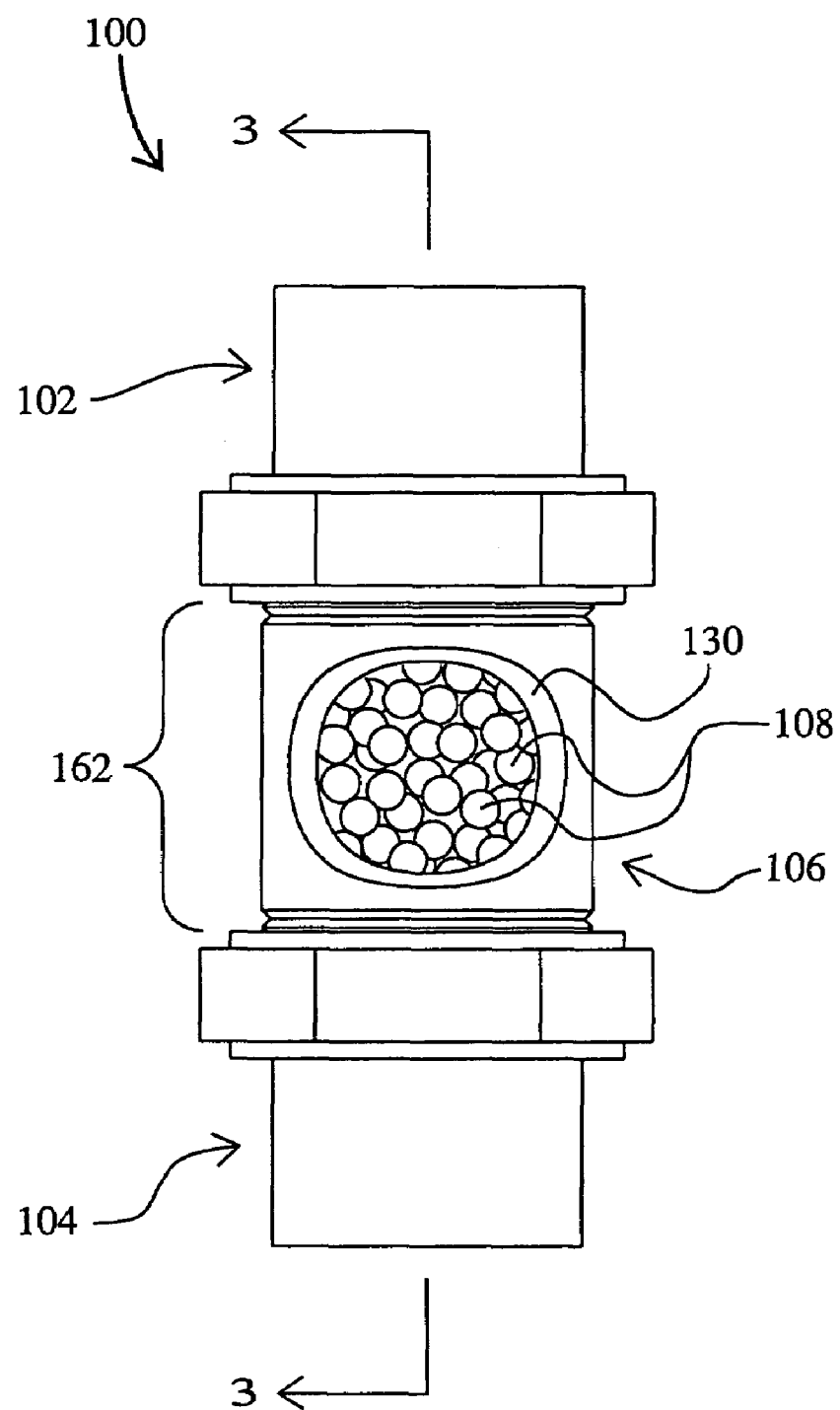
FIG. 2 is a side elevational view of the dryness indicator of FIG. 1.

Turning now to the drawings, wherein like reference numerals indicate like elements in all of the several views, FIGS. 1 and 2 illustrate a low-profile dryness indicator apparatus 100. It will be seen that the indicator 100 has the look of a small compressed air/gas line fitting. There are two end connectors 102 and 104 for installing the indicator 100 into a compressed air/gas line, but the primary feature of interest is an indicator body assembly 106 containing a quantity of dryness-indicating material 108. The indicator body assembly 106 maintains the dryness-indicating material 108 in contact with the air/gas stream passing through the apparatus 100, and is constructed so that the dryness-indicating material can be readily viewed from outside the indicator 100. As additionally shown in FIG. 5, the indicator 100 is adapted for point-of-use operation in an air/gas line delivering compressed air or gas to an air/gas-driven tool. More particularly, the indicator is intended to be installed between a compressed air/gas hose line "L" and an air/gas-driven tool "T," which is shown by way of example in FIG. 5 to be a paint gun. At this location, the dryness-indicating material 108 within the indicator 100 can be readily viewed while the tool "T" is being used insofar as the indicator 100 will normally always be in the line of sight of a person working on a workpiece, such as a surface to be painted. As will become apparent from the further description to follow, the indicator 100 is well suited for point-of-use installation due to its compact and unobtrusive nature, and a rugged construction that allows the indicator to withstand adverse conditions, such as shock and crush forces.

Figure 3:
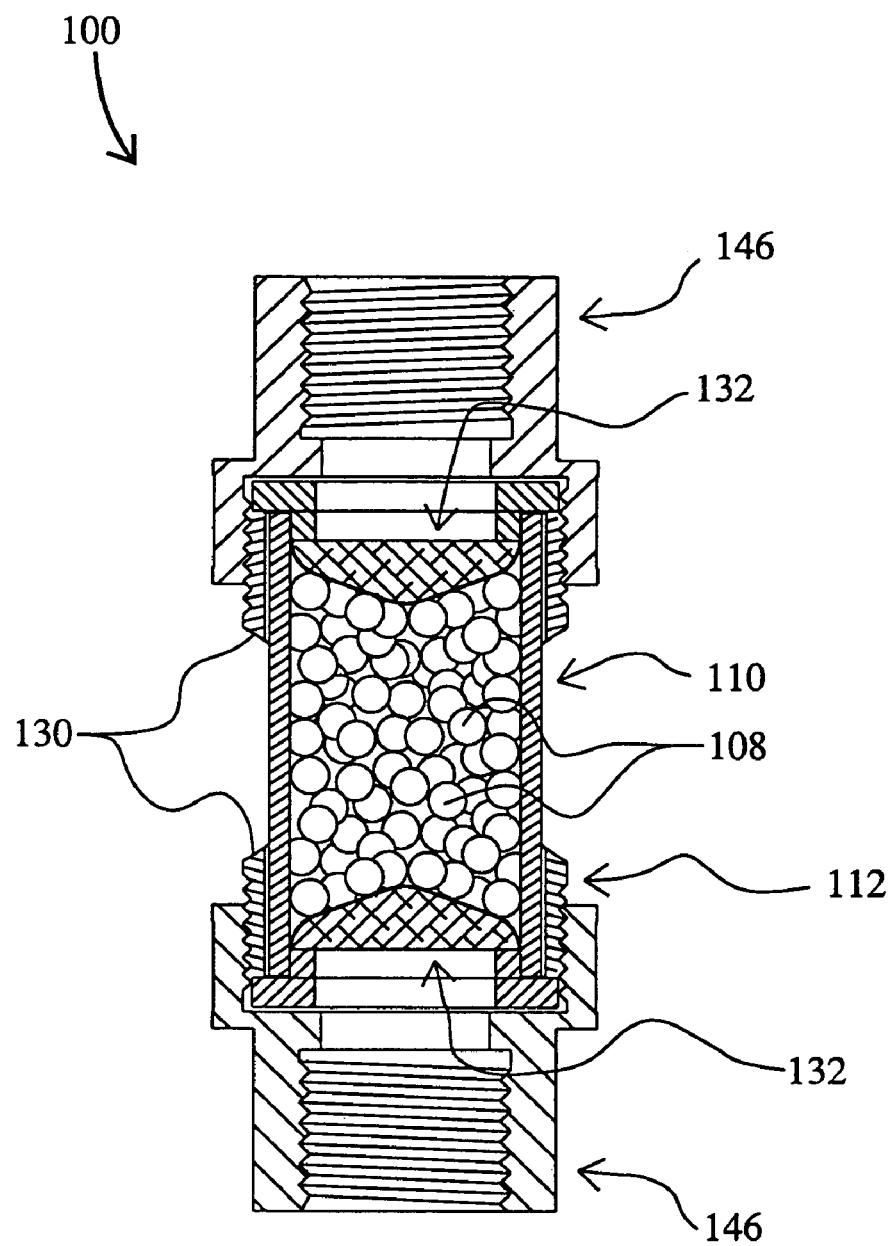
FIG. 3 is a cross-sectional view taken along line 3-3 in FIG. 2 showing the indicator of FIG. 1.
Figure 4:
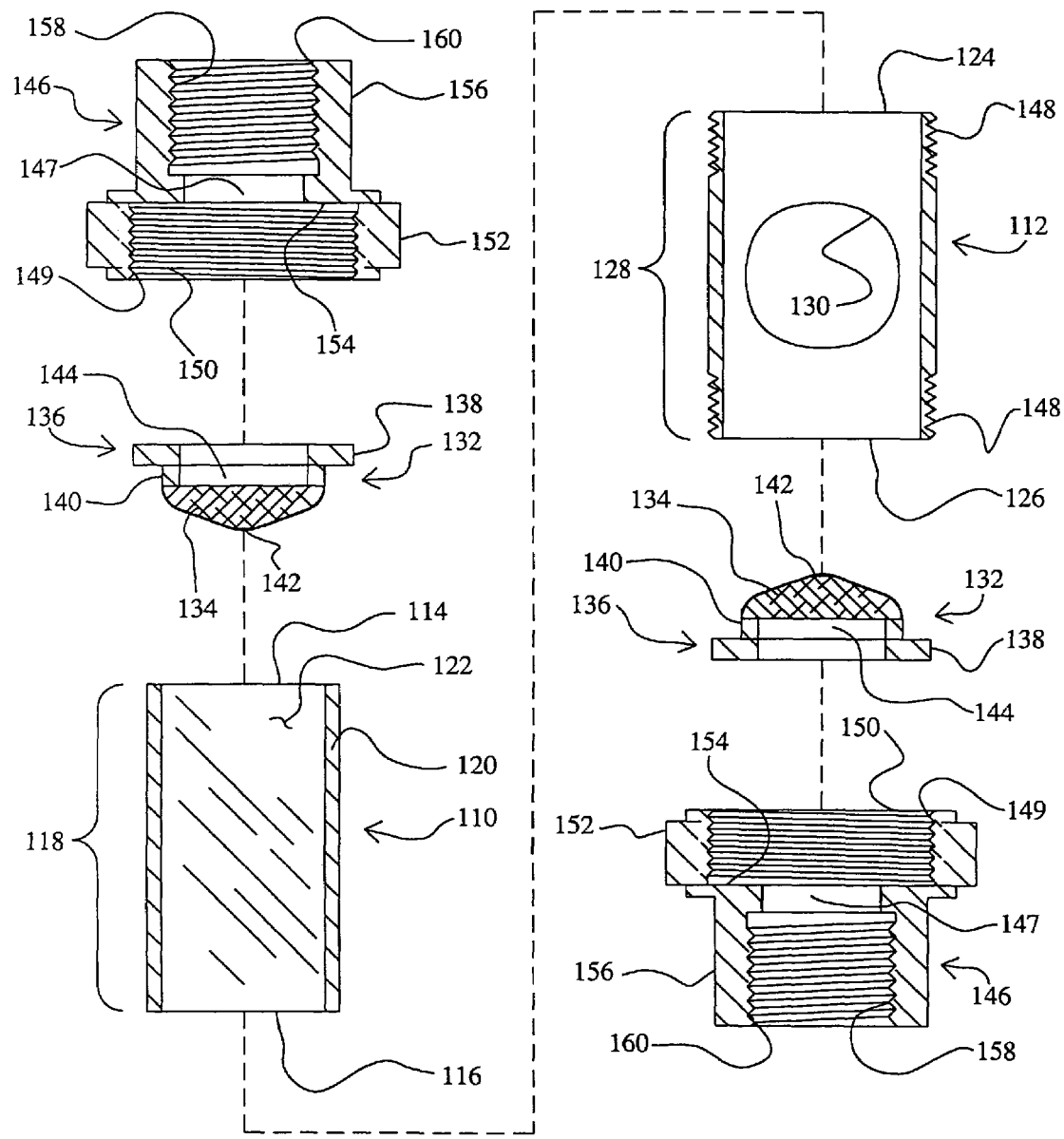
FIG. 4 is an exploded cross-sectional view according to FIG. 3, with the indicator rotated 90 degrees about its longitudinal centerline and with the desiccant being removed for clarity.

Turning now to FIGS. 3 and 4, the indicator body assembly 106 of the indicator 100 features a two-piece construction that includes a vessel 110 and a rigid protective housing 112. With particular reference now to FIG. 4, it will be seen that the vessel 110 has a first end 114, a second end 116, and a central portion 118 disposed between the first and second ends. The vessel 110 is preferably generally tubular in shape, but it will be appreciated that other cross-sectional configurations could also be used. The central portion 118 is formed by a light transmissive vessel wall 120 that can be made from borosilicate glass or other suitable material that is either transparent or translucent. If borosilicate glass is used, it is preferably fire-polished, not wet cut, and is rated to 1000 psi. This vessel wall 120 defines a containment chamber 122 for containing the dryness-indicating material 108 (not shown in FIG. 4 for clarity). The dryness-indicating material 108 is preferably provided by a conventional color-changing desiccant, such as a quantity of silica gel beads treated with a moisture sensitive, color-indicating material, like cobalt salt. The desiccant beads have a bead diameter of between about 0.1 to 0.125 inches in order to provide good moisture sensitivity and visibility (which could be diminished if the beads are too large) without introducing undue pressure drop (which could occur if the beads are too small).

As an alternative to using a desiccant, the dryness-indicating material 108 could be a moisture sensitive paper that turns color according to the surrounding moisture content. For example, as is conventionally known, when Bromide salts are distributed on litmus paper, a color change from light lime green to deep yellow will be exhibited as the relative humidity increases in the air/gas to which the paper is exposed. The relative humidity level at which this color change occurs can be formulated according to the distribution of the Bromide salt material on the paper. This implies that the moisture indicating characteristics of the paper can be adjusted according to the application. Thus, for tools requiring very dry air, the moisture sensitive paper could be designed so that the color change occurs at a low relative humidity threshold, such as about 10-20%. Higher relative humidity thresholds could be used for tools that are not as sensitive to moisture. It will be appreciated that other known varieties of moisture sensitive paper may also be used to produce different colors at different levels of moisture content.

In the event that moisture sensitive paper is used in lieu of desiccant, the manner in which it is applied to the indicator body assembly 106, as well as the construction of the assembly itself, can be varied in a number of ways. One technique would be to spray the moisture sensitive paper in particulate form onto the inside of the vessel 110, along with a suitable adhesive agent. Another technique would be to roll a sheet of the moisture sensitive paper into a tube and insert it into the vessel 110. A further option would be to spray or otherwise affix the moisture sensitive paper to a solid substrate that is then placed in the vessel 110, such as a flat plate, a disk, a cylinder, a sphere, etc.

The housing 112 has a first end 124, a second end 126 and a durable, crush-resistant, central cover portion 128 that is disposed around the vessel wall 120. To provide the required durability and crush resistance, the housing 112 is preferably made from brass or other strong metal. Non-metallic materials, such as a sufficiently rigid and durable plastic, could also be used. As additionally shown in FIGS. 1-3, two closed-perimeter view ports 130 are formed on opposing sides of the central portion 128 of the housing 112, for viewing the dryness-indicating material 108 within the containment chamber 122. The term "closed-perimeter" refers to the fact that each view port 130 has structural material around the entire view port perimeter. In contrast, an example of an open-perimeter view port would be a design where the view port is formed by a slot extending from one of the first or second ends 124 or 126 of the housing 112. It will be appreciated that this latter design would be weaker and provide less crush resistance than the closed-perimeter design, and is therefore not preferred. It will be appreciated that although the view ports 130 are shown as being generally circular, other closed-perimeter shapes could also be used, such as ellipses, rectangles, triangles or other polygons.

The first and second ends 114 and 116 of the vessel 110 are closed by a pair of air/gas-permeable closures 132. Each of the closures 132 is formed by a domed screen 134 and a resilient seal 136. The screen 134 extends substantially across the entire cross-sectional area defined by the vessel wall 120, and must thus be permeable to the air/gas stream passing through the indicator 100. The screen 134 can be made from any suitable air/gas permeable material provided it is also strong enough to perform its function of retaining the dryness indicating material 108 within the containment chamber 122 (see FIG. 3). A perforated metal sheet made from stainless steel or the like, or a metal weave, is preferred. A sieve size of about 50 mesh may be used if the dryness indicating material 108 comprises silica gel beads. This sieve size is sufficiently small to trap desiccant bead particles that can be produced should the beads fracture and break apart during use of the indicator 100, yet is not so small as to produce unwanted pressure drop.

The resilient seal 136 of each closure 132 can be made from silicone rubber or the like. It includes a peripheral "O-ring" portion 138 adapted to engage one end 114 or 116 of the vessel 110, and a stub portion 140 that extends generally orthogonally from the principal plane of the ring portion 138. As best shown in FIG. 3, the stub portion 140 of each resilient seal 136 enters the vessel 110 and engages the interior surface of the vessel wall 120 for a short distance, thereby assisting in sealing of the air/gas stream. Note that the resilient seal 136 of each closure 132 could seat against other seal support surfaces, if such are provided on the vessel 110. For example, although not shown, it would be possible to form a pair of seal support shoulders within the interior of the vessel 110 if it was desired for some reason to recess the closures 132 from the ends 114 and 116 of the vessel. This design would provide a smaller containment chamber 122 that is less than the length of the vessel 110.

The periphery of the screen 134 can be secured to the seal 136 by molding the seal in the presence of the screen. This molding process will tend to produce the stub portion 140 of the seal 136 as a coating of seal material supported by the mesh of the screen 134. The screen 134 could also be secured to the seal 136 using other methods, such as adhesive bonding.

It will be observed that the screen 134, due to its domed shape, forms a protuberance or central raised portion 142 on an inner side thereof that extends into the containment chamber 122 of the vessel 110 (see FIG. 3). The domed shape of the screen 134 likewise forms a plenum-defining cavity 144 on an outer side thereof facing away from the containment chamber 122. Although the shape of the screen 134 is generally rounded in FIGS. 3 and 4, it will be appreciated that other screen shapes, such as conical, frustoconical, etc., could also be used. What is important is that the screen 134 be non-planar. Indeed, it has been confirmed by testing that a non-planar screen shape dramatically reduces pressure drop through the indicator 100 when compared to a planar screen. By way of example, when the domed screens 134 of FIGS. 3 and 4 were used in the indicator 100, the pressure drop was approximately 50% less than it was when planar screens where used in the same indicator. It is believed that this reduction in pressure drop may be due to the increased surface area of the screen 134 caused by its non-planar configuration, coupled with the presence of the plenum-defining cavity 144 that allows the compressed air or gas passing through the indicator 100 to freely distribute itself across the entire cross-sectional area of the vessel 110.

Minimizing pressure drop is an important goal when it is considered that the indicator 100 is primarily intended to be used in a compressed air/gas system that already incorporates a conventional filter/dryer in the compressed air/gas line. The existing filter/dryer will normally produce its own pressure drop, and its output pressure may not be significantly higher than what is required by the air/gas-driven tool. In a painting application, for example, an HVLP (High Volume Low Pressure) spray guns require a minimum pressure of 30-40 psi in order to operate properly. The indicator 100 must be capable of delivering air or gas at the required pressure, and every effort must be made to avoid reducing the line pressure significantly below what is provided to the inlet side of the indicator. By virtue of the domed configuration of the screens 134, the indicator 100 is able to function as a low-pressure-drop dryness indicator apparatus, while maintaining a low-profile configuration.

The end connectors 102 and 104 of the indicator 100 are provided by a pair of end cap fittings 146 that are disposed on the first and second ends 124 and 126 of the housing 112. The end cap fittings 146 are preferably made of the same material as the housing 112. Thus, if the housing 112 is brass, the end cap fittings 146 will also be brass. Alternatively, the housing 112 and the end cap fittings 146 could be made of different materials. A central bore 147 extending through each end cap fitting 146 provides a passage for transferring air or gas to or from an adjacent one of the plenum-defining cavities 144.

Threaded connections may be used to secure the end cap fittings 146 to the housing 112. More particularly, the housing 11-2 can be provided with external threads 148 extending from each end 124 and 126 thereof, and each end cap fitting 146 can be counterbored at 149 and tapped with corresponding female threads 150. In an alternative configuration, the housing 112 could be formed with female threads while the end cap fittings 146 are formed with corresponding male threads. As additionally shown in FIGS. 1 and 2, a hexagonal wrench pattern 152 can be formed on the end cap fittings 146 to receive a wrench or other tool for threading the end cap fittings onto the housing 112. The wrench pattern 152 is also used to receive a wrench or other tool when installing the indicator 100 in a compressed air/gas system, as described in more detail below. The wrench pattern 152 is situated exteriorly of the counterbores 149 on the end cap fittings 146. It will be appreciated that one the end cap fittings 146 (or perhaps even both) could be non-removably secured to the housing 112, as by forming them integrally therewith.

The base of each counterbore 148 is formed with an annular shoulder 154 that is adapted to help seat the ring portion 138 of each seal 136 of the above-described closures 132. The shoulder 154 is situated so that when the associated end cap fitting 146 is threaded onto the housing 112 and is in its final installation position, the shoulder 154 will compress the seal 136 against an end 114 or 116 of the vessel 110 (or other seal support surface thereof, if present) to improve sealing.

Figure 5:
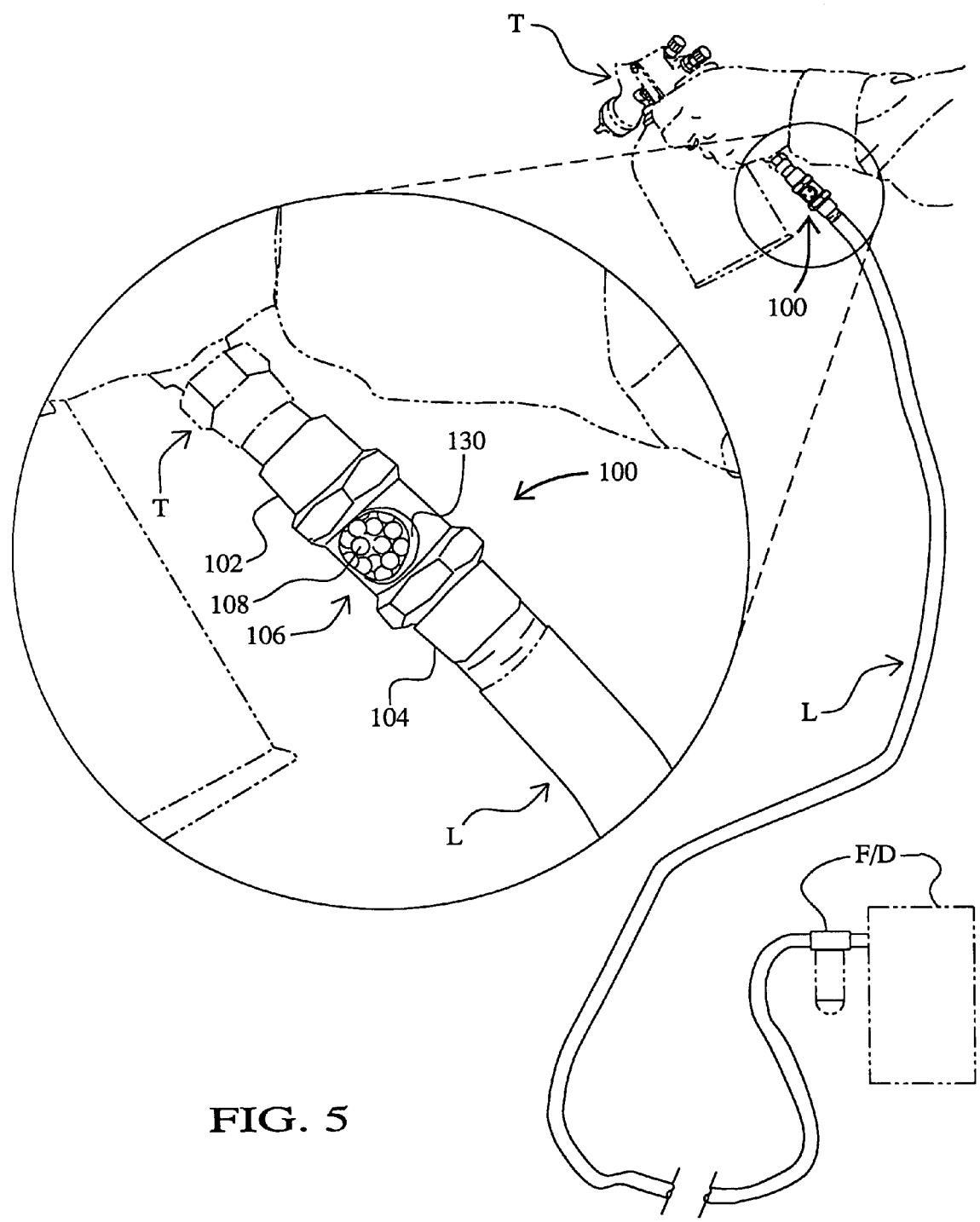
FIG. 5 is a perspective view showing an installation of the dryness indicator of FIG. 1 in combination with an air/gas-driven tool, an air/gas hose line, and a filter/dryer apparatus, and with an inset showing an enlarged view of the dryness indicator.

As additionally shown in FIG. 5, each end cap fitting 146 providing one of the end connectors 102 and 104 is configured for connection to either the air/gas hose line "L" or the tool "T." The end cap fittings 146 thus preferably include standard NPT (National Pipe Thread) thread connection elements 156. In FIGS. 3 and 4, the connection elements 156 include female threads 158 formed in a tapped portion 160 of the central bore 147. It will be appreciated that the thread connection elements 156 of the end cap fittings 146 could also be formed with male threads. Alternatively, one thread connection element 156 on one of the end cap fittings 146 could have male threads, while the other thread connection element 156 on the other end cap fitting 146 could have female threads. As described above, the wrench patterns 152 on the end cap fittings 146 are designed to receive a wrench or other tool for tightening the thread connection elements 156 to corresponding connection elements on the air/gas hose line "L" and the tool "T" during installation of the indicator 100 in a compressed air/gas system.

It will be seen in the various drawing figures that the indicator 100 has a low profile design that is non-bulky and unobtrusive, and thus ideally suited for point-of-use installation and operation in a compressed air/gas application. In particular, as best shown in FIG. 2, the housing 112 has a major surface portion 162 extending between the end connectors 102 and 104 that is substantially the same cross-sectional size as the air/gas hose line "L" to which the indicator 100 is attached (see FIG. 5). Correspondingly, the vessel 110, which is inside the housing 112, has a major surface portion (i.e., the outer surface of the vessel wall 120) whose cross-sectional size is less than that of the air/gas hose line "L." The length of the indicator 100 (in the direction of air/gas flow) can also be minimized by reducing the distance spanned by the major surface portion 162 so as not to substantially exceed its cross-sectional size, and preferably to be less than or equal to its cross-sectional size.

Apart from the wrench receiving portion 152 of the end cap fittings 146, each end cap is also configured so as not to exceed the cross-sectional size of the air/gas hose line "L." In particular, each thread connection element 156 has major surface portion that is of substantially the same cross-sectional size as the housing 112, and thus the air/gas hose line "L" also. On the other hand, the length of each thread connection element 156 is of standard dimension in order to conform to NPT specifications.

One design aspect of the indicator 100 that allows it to remain small and non-bulky is that the amount of desiccant required to provide the dryness indicator 108 is substantially less than the amount of desiccant that would be required if the indicator 100 was relied on as the sole means of providing a drying function in a compressed air/gas system. Instead, by using the indicator 100 primarily to indicate the presence of moisture, and installing it in a system that already has a filter/dryer, such as the filter/dryer "F/D" shown in FIG. 5, the advantages of a low-profile, point-of-use dryness indicator may be fully realized. The filter/dryer "F/D" in conjunction with which the indicator 100 can be used may comprise any conventional filtering and drying system. As is known, such systems are often mounted on a wall adjacent to a work area, but larger systems can be centrally located in order to serve a number of work areas.

As an alternative to using the indicator 100 in conjunction with a conventional filter/dryer system, the indicator can be mounted to the end of a flexible in-line, point-of-use filter/dryer of the type disclosed in the above-referenced provisional application Ser. No. 60/553,163, and which is further disclosed in copending, commonly-owned regular application Ser. No. 10/931,470 (now U.S. Pat. No. 7,108,740). The latter application is entitled "Flexible, Inline Point-Of-Use Air/Gas Dryer," and was filed on even date with the present application. The contents of provisional application Ser. No. 60/553,163 and U.S. Pat. No. 7,108,740 are both fully incorporated herein by this reference.

Figure 6:
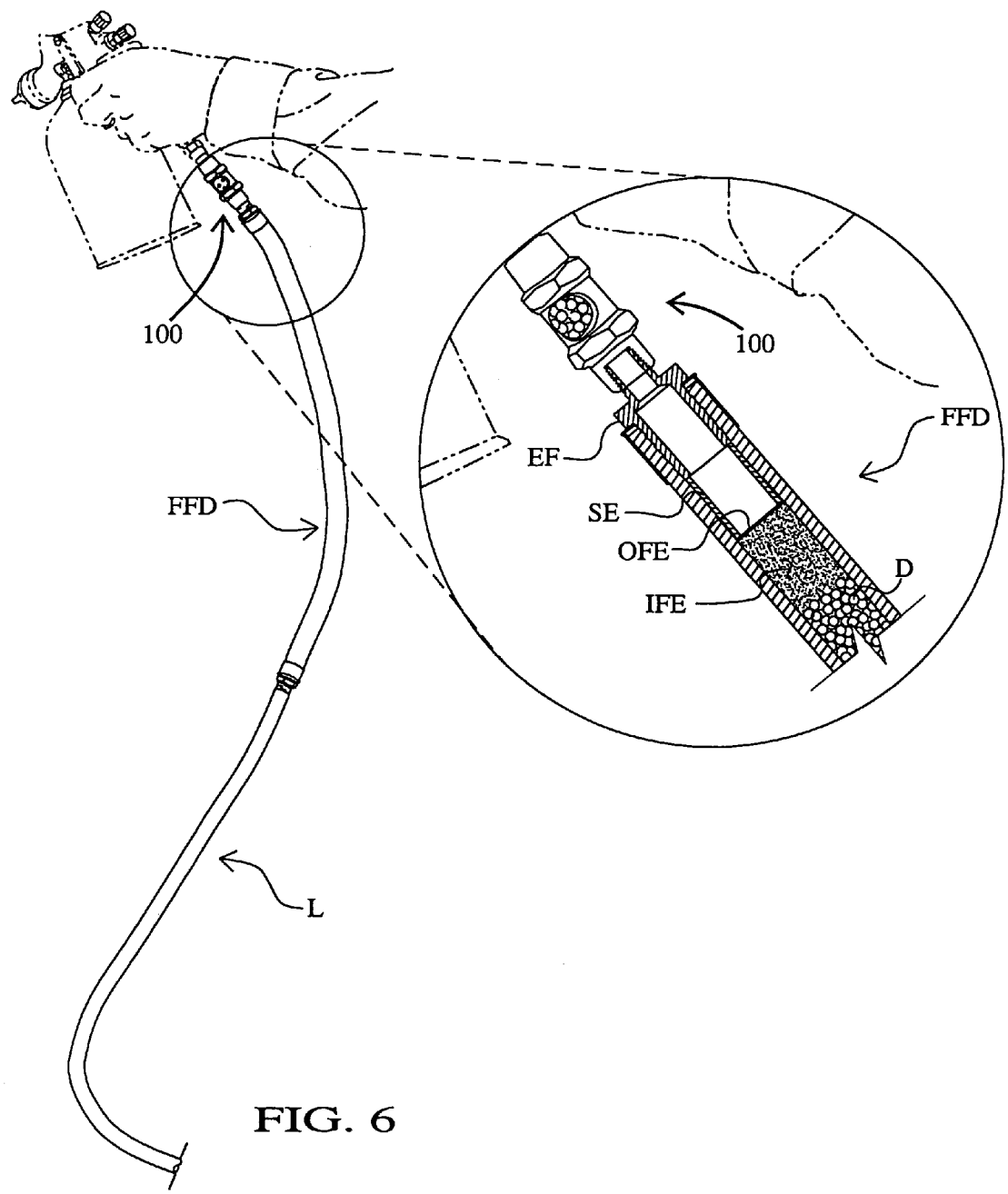
FIG. 6 is a perspective view showing an installation of the dryness indicator of FIG. 1 in combination with an air/gas-driven tool and a flexible in-line, point-of-use filter/dryer, and with an inset showing an enlarged view of the dryness indicator and an end portion of the filter/dryer.

As shown in the inset of FIG. 6 of the present application, the flexible filter/dryer (labeled as "FFD" in FIG. 6) comprises an elongated flexible body substantially filled with a moisture adsorbing desiccant "D." The desiccant "D" is retained at each end of the flexible filter/dryer "FFD" by an inline sequence of an inner filter element "IFE," an outer filter element "OFE," a spacer element "SE," and an end fitting "EF" provided with an NPT threaded connector. The indicator 100 of the present application is ideally suited to be installed on the point-of-use end of the flexible filter/dryer "FFD" because both have a low-profile configuration and do not interfere with the use of the attached compressed air/gas tool "T."

Accordingly, an inline, point-of-use air/gas dryness indicator has been disclosed that solves the problems identified by way of background above. It should be understood that the description and the drawings herein are merely illustrative, and it is contemplated that various modifications, combinations and changes can be made thereto without departing from the scope of the invention. Moreover, although the disclosed dryness indicator has been shown in combination with a paint gun, other air/gas-driven tools, such as drills, screw drivers, staplers, nailers, die grinders, chisels, impact wrenches and ratchets, sand blasters and sanders, as well as inflation (e.g., tires) devices, could be used with a dryness indicator constructed in accordance with the invention. As such, the invention is not to be in any way limited except in accordance with the spirit of the appended claims and their equivalents.

What is claimed is:

1. A low-profile dryness indicator apparatus for point-of use operation in an air/gas line delivering compressed air or gas to an air/gas-driven tool, comprising:

a vessel having a first end, a second end, and a central portion disposed between said first and second ends;

said central portion of said vessel being formed by a light transmissive vessel wall that defines a containment chamber for containing a desiccant material;

a dryness-indicating, color-changing desiccant in said containment chamber;

a rigid protective housing having first and second ends and a durable, crush-resistant, central cover portion disposed around said vessel wall;

a closed-perimeter view port in said central portion of said protective housing for viewing said dryness-indicating material in said containment chamber;

first and second air/gas-permeable closures respectively closing said first and second ends of said vessel, said closures each having a central raised portion on an inner side thereof extending into said containment chamber and a plenum-defining cavity on an outer side thereof facing away from said containment chamber;

first and second end cap fittings respectively disposed on said first and second ends of said protective housing, said end cap fittings each being configured for connection to an air/gas line or a tool and comprising an air passage for transferring air or gas to or from an adjacent one of said plenum-defining cavities; and said protective housing having a major surface portion that is substantially the same cross-sectional size as an air/gas line to which said dryness indicator is adapted to be attached.

2. An apparatus according to claim 1, wherein said vessel comprises a fire-polished borosilicate glass tube.

3. An apparatus according to claim 1, wherein said desiccant comprises desiccant beads having a diameter ranging from about 0.1 to 0.125 inches.

4. An apparatus according to claim 1, wherein said protective housing comprises a metal tube and said first and second end cap fittings are metal fittings that are separate from said protective housing and threadably mounted on said first and second ends of said protective housing, respectively.

5. An apparatus according to claim 4, wherein said protective housing and said first and second end cap fittings are made of brass and wherein said first and second end cap fittings each comprise wrench receiving surfaces for assisting in threading said first and second end cap fittings onto said protective housing and installing said apparatus in a compressed air/gas system using a wrench.

6. An apparatus according to claim 1, wherein said first and second air/gas-permeable closures comprise non-planar screen elements.

7. An apparatus according to claim 6, wherein said screen elements are generally dome-shaped.

8. An apparatus according to claim 7, wherein said first and second air/gas-permeable closures further comprise peripheral seals adapted to seat on first and second end portions of said vessel.

9. An apparatus according to claim 8, wherein said first and second end cap fittings on said protective housing comprise seal-receiving shoulders adapted to support said seals against said first and second end portions of said vessel.

10. An apparatus according to claim 1, wherein said protective housing comprises two of said closed-perimeter view ports disposed on opposing sides of said central portion of said protective housing, said view ports being generally circular in shape.

11. A low-profile dryness indicator apparatus for point-of-use operation in an air/gas line delivering compressed air or gas to an air/gas-driven tool, comprising:

a vessel having a first end, a second end, and a central portion disposed between said first and second ends;

said central portion of said vessel being formed by a light transmissive vessel wall that defines a containment chamber for containing a dryness indicating material;

a dryness-indicating material in said containment chamber;

said vessel comprising a major surface portion that is smaller in cross-sectional size than an air/gas line to which said dryness indicator is adapted to be attached;

a rigid protective housing having first and second ends and a durable, crush-resistant, central portion that contains said vessel and whose inner surface is substantially proximate to said major surface portion of said vessel;

a closed-perimeter view port in said central portion of said housing for viewing said dryness-indicating material in said containment chamber;

first and second air/gas-permeable closures respectively closing said first and second ends of said vessel and retaining said dryness-indicating material in said containment chamber;

first and second end fittings respectively mounted on said first and second ends of said protective housing, said end fittings being configured for attachment to an air/gas line or a tool and each comprising an air passage for transferring air or gas to or from said vessel; and said protective housing and said first and second end fittings each having a major surface portion that is substantially the same cross-sectional size transverse to a longitudinal axis of said dryness indicator as an air/gas line to which said dryness indicator is adapted to be attached, and said protective housing having a length dimension that does not substantially exceed its cross-sectional size.

12. An apparatus according to claim 11, wherein said vessel comprises a transparent or translucent tube.

13. An apparatus according to claim 11, wherein said vessel comprises a borosilicate glass tube.

14. An apparatus according to claim 13, wherein said housing and said end cap fittings are separate components made of brass.

15. An apparatus according to claim 11, wherein said dryness-indicating material comprises a moisture sensitive paper.

16. An apparatus according to claim 11, wherein said dryness-indicating material comprises a color-changing desiccant.

17. An apparatus according to claim 16, wherein said apparatus further includes first and second plenums situated between said containment chamber and said first and second fittings on said protective housing.

18. An apparatus according to claim 17, wherein said first and second plenums are respectively defined by said first and second air/gas permeable end closures being formed with a non-planar shape that creates a protuberance on a first side thereof extending into said containment chamber and a plenum-defining cavity on a second side thereof facing away from said containment chamber and toward one of said end fittings on said protective housing.

19. An apparatus according to claim 18, wherein said protuberance is generally dome-shaped.

20. An apparatus according to claim 18, wherein said first and second air/gas-permeable closures further comprise peripheral seals adapted to seat on said first and second end portions of said vessel.

21. An apparatus according to claim 20, wherein said peripheral seals include an interior stub portion that engages an interior wall of said vessel and mounts an air/gas-permeable screen that defines said protuberance.

22. A low-pressure-drop dryness indicator apparatus for point-of-use operation in an air/gas line delivering compressed air or gas to an air/gas-driven tool, comprising:

a vessel having first and second seal support surfaces and a central portion disposed between said first and second seal support surfaces;

said central portion of said vessel being formed by a light transmissive vessel wall that defines a containment chamber for containing a desiccant material;

a dryness-indicating, color-changing desiccant material in said containment chamber;

first and second air/gas-permeable screen closures each comprising a peripheral seal adapted to seat on one of said seal support surfaces, said closures each further including a non-planar screen that creates a protuberance on a first side thereof extending into said containment chamber and a plenum-defining cavity on a second side thereof facing away from said containment chamber;

said vessel and said first and second air/gas-permeable screen closures being disposed in a protective housing having a view port for viewing said color changing desiccant in said containment chamber;

a pair of end cap fittings on said protective housing configured for attachment to an air/gas line or a tool and each comprising an air passage for transferring air or gas to or from an adjacent one of said plenum-defining cavities; and said end cap fittings each including a shoulder engaging one of said peripheral seals and urging it against one of said seal support surfaces.

23. An apparatus according to claim 22, wherein said peripheral seals of said first and second air/gas-permeable screen closures each further comprise an interior stub portion that engages an interior wall of said vessel and mounts said non-planar screen.

24. An apparatus according to claim 22, wherein said vessel comprises a borosilicate glass tube.

25. An apparatus according to claim 22, wherein said desiccant comprises desiccant beads having a diameter ranging from about 0.1 to 0.125 inches.

26. An apparatus according to claim 22, wherein said protective housing comprises a metal tube and said end cap fittings are metal fittings that are separate from said protective housing and threadably mounted on said first and second ends of said housing, respectively.

27. An apparatus according to claim 26, wherein said protective housing and said first and second end cap fittings are made of brass and wherein said first and second end cap fittings each comprise wrench receiving surfaces for assisting in threading said first and second end cap fittings onto said protective housing and for installing said apparatus in a compressed air/gas system using a wrench.

28. An apparatus according to claim 22, wherein said view port is a closed perimeter view port.

29. An apparatus according to claim 28, wherein said protective housing comprises two of said closed-perimeter view ports disposed on opposing sides of said protective housing, said view ports being generally circular in shape.

30. An apparatus according to claim 22, wherein said protective housing has a major surface portion that is substantially the same cross-sectional size as an air/gas line to which said dryness indicator is adapted to be attached.

31. An apparatus according to claim 30, wherein said first and second end cap fittings on said protective housing each have a major surface portion that is substantially the same cross-sectional size as an air/gas line to which said dryness indicator is adapted to be attached.

32. A dryness indicator apparatus for point-of use operation in an air/gas line delivering compressed air or gas to an air/gas-driven tool, comprising:

a vessel having a first end, a second end, and a central portion disposed between said first and second ends;

said central portion of said vessel being formed by a light transmissive vessel wall that defines a containment chamber for containing a desiccant material;

a dryness-indicating, color-changing desiccant material in said containment chamber;

first and second air/gas-permeable closures respectively closing said first and second ends of said vessel, said closures each having a central raised portion extending into said containment chamber and a plenum-defining cavity on an outer side thereof facing away from said containment chamber;

said vessel and said first and second closures being disposed in a protective housing having a view port for viewing said color changing desiccant in said containment chamber;

a pair of end cap fittings on respective ends of said protective housing configured for attachment to an air/gas line or a tool and each comprising an air passage for transferring air or gas to or from an adjacent one of said plenum-defining cavities; and said end cap fittings each engaging one of said closures and retaining it in position on said vessel.

33. A low-profile dryness indicator apparatus for point-of use operation in an air/gas line delivering compressed air or gas to an air/gas-driven tool, comprising:

an indicator body assembly;

a quantity of dryness-indicating material disposed in said indicator body assembly;

said indicator body assembly being configured so that said dryness-indicating material is visible from outside said indicator apparatus;

first and second air/gas-permeable closures respectively closing said first and second ends of said vessel and retaining said dryness-indicating material in said containment chamber;

a pair of end connectors at respective ends of said indicator body assembly, said end connectors being configured for attachment to a compressed air/gas line or a tool; and said indicator body assembly and said first and second end connectors each having a major surface portion that is substantially the same cross-sectional size transverse to a longitudinal axis of said dryness indicator as an air/gas line to which said dryness indicator is adapted to be attached, and said indicator body assembly having a length dimension that does not substantially exceed its cross-sectional size.

34. An apparatus according to claim 33, wherein said dryness-indicating material comprises a color-changing desiccant.

35. An apparatus according to claim 33, wherein said dryness-indicating material comprises color-changing desiccant beads.

* * * * *